United States Patent
Sahai

(10) Patent No.: US 11,080,670 B2
(45) Date of Patent: Aug. 3, 2021

(54) INTEGRATED RETAIL PLATFORM

(71) Applicant: NCR Corporation, Duluth, GA (US)

(72) Inventor: Ritesh Kumar Sahai, Bangalore (IN)

(73) Assignee: NCR Corporation, Atlanta, GA (US)

(*) Notice: Subject to any disclaimer, the term of this patent is extended or adjusted under 35 U.S.C. 154(b) by 331 days.

(21) Appl. No.: 15/821,246

(22) Filed: Nov. 22, 2017

(65) Prior Publication Data

US 2019/0156309 A1    May 23, 2019

(51) Int. Cl.
| | | |
|---|---|---|
| *G06Q 20/12* | (2012.01) | |
| *G06Q 10/08* | (2012.01) | |
| *G06Q 20/20* | (2012.01) | |
| *G07G 1/12* | (2006.01) | |

(52) U.S. Cl.
CPC .......... *G06Q 20/12* (2013.01); *G06Q 10/087* (2013.01); *G06Q 20/20* (2013.01); *G06Q 20/202* (2013.01); *G06Q 20/206* (2013.01); *G07G 1/12* (2013.01)

(58) Field of Classification Search
CPC ...... G06Q 20/12; G06Q 20/20; G06Q 20/202; G06Q 10/087
USPC ...................................... 705/18, 16
See application file for complete search history.

(56) References Cited

U.S. PATENT DOCUMENTS

| | | | | |
|---|---|---|---|---|
| 6,370,515 B1* | 4/2002 | Diamond | ............... | G06Q 10/08 705/22 |
| 2003/0163388 A1* | 8/2003 | Beane | ................... | G06Q 20/04 705/26.1 |
| 2010/0159907 A1* | 6/2010 | Farley | ................... | G06Q 20/20 455/418 |
| 2010/0169336 A1* | 7/2010 | Eckhoff-Hornback | | G06Q 10/087 707/758 |
| 2014/0279479 A1* | 9/2014 | Maniar | ................... | G06Q 20/36 705/41 |
| 2014/0310183 A1* | 10/2014 | Weber | ................ | G06Q 20/3829 705/71 |
| 2015/0106217 A1* | 4/2015 | Radu | ................... | G06Q 20/202 705/21 |
| 2015/0339665 A1* | 11/2015 | Hayhow | ............. | G06Q 20/401 705/71 |
| 2016/0212174 A1* | 7/2016 | Raleigh | ................ | H04M 15/00 |

* cited by examiner

*Primary Examiner* — Florian M Zeender
*Assistant Examiner* — Christopher R Buchanan
(74) *Attorney, Agent, or Firm* — Schwegman, Lundberg & Woessner

(57) ABSTRACT

Disclosed here are systems and methods for providing an integrated retail platform. The systems and methods can include receiving, by a computing device comprising a processor, a configuration data for a plurality of service terminals. The systems and methods can include computing device receiving updated configuration data for the plurality of service terminals. The computing device can transmit the updated configuration data to the plurality of service terminals.

18 Claims, 3 Drawing Sheets

US 11,080,670 B2

INTEGRATED RETAIL PLATFORM

BACKGROUND

In a retail environment a plurality of terminals can be used to track inventory and allow customers to purchase items. For example, a store can have a plurality of cash registers located throughout the store. When customers have finished shopping they can take items to any one of the cash registers to pay for the items before leaving the store.

SUMMARY

Disclosed here are systems and methods for providing an integrated retail platform. The systems and methods can include receiving, by a computing device comprising a processor, a configuration data for a plurality of service terminals. The systems and methods can include computing device receiving updated configuration data for the plurality of service terminals. The computing device can transmit the updated configuration data to the plurality of service terminals.

BRIEF DESCRIPTION OF THE FIGURES

The above-mentioned and other features and advantages of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views. The exemplifications set out herein illustrate example embodiments, and such exemplifications are not to be construed as limiting the scope of the disclosure in any manner.

DETAILED DESCRIPTION

Figure 1:
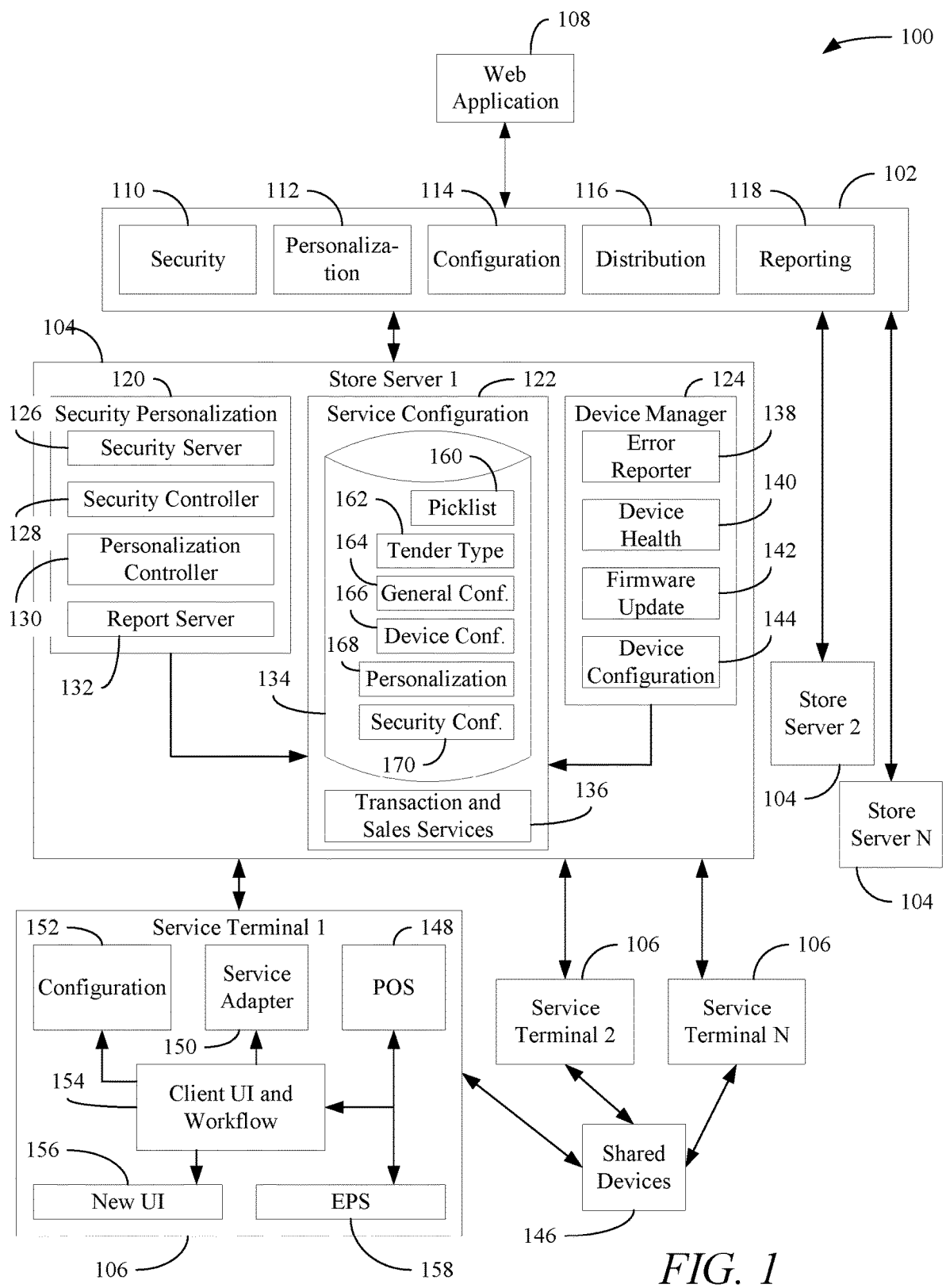
FIG. 1 shows an example schematic of an integrated retail platform consistent with the disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

The systems and methods disclosed herein can provide an integrated retail platform. The systems and methods disclosed herein can allow for retailers and other goods and service providers to utilize a single platform to manage a retail system across various geographic locations. For example, a retailer utilizing the systems and methods disclosed herein can have a central computing device, or main server, that can be used to monitor, configure, and update a plurality of store servers, which can in turn update a plurality of service terminals. For instance, a retail can define a configuration for cashier manned terminals as well as self-service terminals at a central location and push the configuration to all terminals or a subset of terminals. For example, the retailer can configure the terminals in a first geographic location to have a first configuration and the terminals in a second geographic location to have a second configuration.

In addition, the systems and methods disclosed herein can allow for the implantation of security protocols, allow for custom configurations for service terminals, as well as provide for monitoring and reporting. For example, the systems and methods disclosed herein can allow for a subset of terminals to have custom configurations. The custom configurations can be based on a particular user signed into a terminal or a role of the terminal. For example, a manager can log into a service terminal and as a result, the service terminal can load a custom configuration that provides greater permissions to the manager. In addition, a customer of a merchant can sign into a service terminal and as a result, a custom profile can be loaded. The custom profile can allow for certain functions to be displayed (e.g., favorites or most used functions) and other functions to not be displayed.

Turning now to the figures, FIG. 1 shows an example schematic of an integrated retail platform 100 consistent with embodiments disclosed herein. The integrated retail platform 100 can include a main server 102, one or more store servers 104, and one or more client terminals 106. For clarity, only one of the store servers 104 and service terminals 106 are shown in detail.

The store servers 104 can be located at various retail locations throughout a region or other geographic locations. For example, a big box retailer can have a store server 104 at each location the retailer has a store. The service terminals 106 can be located at various locations and include different types of terminals. For instance, a retail store can have several different departments and each department can have different types of terminals. For example, a main checkout area can have a combination of manned cashier terminals as well as self-service terminals. An automotive department can have manned cashier terminals and a lawn and gardening department can have a combination of manned cashier terminals and self-service terminals.

In addition, the store servers 104 and the service terminals 106 can be in different types of stores. For example, a merchant can operate a chain of pool supply stores as well as a change of hobby supply stores. As a result, the merchant can utilize the systems and methods disclosed herein to establish configurations and protocols for the different types of establishments the merchant operates using a single interface.

During use, a user can utilize a web application 108 to interface with the main server 102. The main server 102 can include an enterprise suite that can include a collection of modules, applets, or application designed to meet the needs of customers that may want to monitor, configure and update service terminal installations via the main server 102. The enterprise suite can also allow merchants to generate and view a collection of reports, add different configurations for enterprise level, group of stores and on a store level.

For example, the enterprise suite can include a security module 110. The security module 110 can allow a user, such as an administrative user, to specify security parameters. For example, using the security module 110, the user can define rules that the service terminals 106 can use to protect assets. For instance, the security rules can define under what conditions cash is to be dispensed, weight rules that define what products must be placed in a bagging area and what products can be placed back on a cart before a next item can be scanned. The security parameters can be defined in a collection of security data that can be transmitted from the main server 102 to the store servers 104. As discussed herein, the store servers 104 can transmit the security data to the service terminals 106.

The security module 110 can also define communication mechanisms and underlying protocols. For example, the security module 100 can define the encryption level used for various communication as well as store public and private keys. In addition, the security module 110 can allow security levels to dynamically adapt to the store conditions. For example, if a reported inventor (e.g., after a quarterly store inventory is performed) for a particular store differs from an expected inventor based on sales and shipping and receiving data, the security module 110 can dynamically adjust security protocols for the store as well as notify loss prevention personal at the store of steps to take to help minimize inventor shrink.

The enterprise suite can include a personalization module 112. The personalization module 112 can allow a user to personalize the service terminals 108 and a web interface a customer can use. For example, the user can personalize the service terminals 106 such that are located in a first geographic region to have a particular look and feel while service terminals 106 located in a second geographic region can be personalized to have a different look and feel. Furthermore, as indicated herein, a merchant can operate different types of retail establishments and as such, can personalize the service terminals 102 located at the different retail establishments. For example, one type of establishment can be an auto parts store and another type of establishment can be a sporting goods store. Using the personalization module 112, the user can personalize service terminals 106 located in the auto parts stores one way and the service terminals 106 located in the sporting goods store another. The personalization module 112 can also allow for the personalization of the lane experience includes volume, language, personalized favorites for the customer picklist selections, etc.

The enterprise suite can include a configuration module 114. The configuration module 114 can allow a user to configures the service terminals 108. For example, the user can configure the service terminals 106 to operate in a given manner. For example, the user can configure the service terminals 106 to only accept certain types of tender for payment. For instance, the user can configure the service terminals 106 to only accept cash and certain credit card cards.

The enterprise suite can include a distribution module 116. The distribution module 116 can include polices for distributing configuration and other data to the store servers 104. For example, the distribution module 116 can include rules that define when a given update is to be distributed as well as to what geographic locations updates are to be distributed. For instance, a retailer may have a promotion that is to run for certain days in a first geographic location and for different days in a second geographic location. Using the distribution module 116, the user can define distribution schedules for the first and second geographic locations.

The enterprise suite can also include a reporting module 118. The reporting module 118 can allow a user to generate reports for the integrated retail platform 100. For example, using the web application 108 in conjunction with the reporting module 118, a user can generate reports showing retail activity for a particular store, a collection of stores, a particular product sold by a retailer, a collection of products sold by the retailer, or any combination thereof. The reports can include details such as average sales per hour, per day, average dollar amount per sale, per day, etc.

The web application 108 can also include a customer portal. For example, the web application 108 can allow customers to purchase goods and services from a retailer without having to visit a brick and mortar retail location. The various modules of the enterprise suite can be used via the customer portal as well. For example, personalization module 113 can allow a customer to personalize the look and feel of the web application 108. In addition, the security module 110 can allow the user to configure security parameters such as two-step authentication for purchases or purchases over a preset amount. The reporting module 118 can allow the customer to generate reports showing purchases and other activities.

As shown in FIG. 1, the store servers 104 can include a security-personalization module 120, a service configuration module 122, and a device manager 124. The security-personalization module 120 can include a security server 126, a security controller 128, a personalization controller 130, and a report server 132. Using these various functions and capabilities, the security-personalization module 120 can handle security and personalization related configurations and how those configurations can be applied to servicer terminals 106.

The security server 126 can implement logic for learning weights of individual items. The security server can develop average estimates using a default tolerance for newly learned items. As a result, the default tolerance can evolve into a statistically based tolerance over time. In addition, the security server 126 can send messages to the security controller 128 to collect and update security policies and parameters. The security server 126 can also load default transaction policies and update security manager configuration settings as needed.

The security controller 128 can provide security policy information to the service terminals 106 such that the service terminals 106 can assess security parameters. The security controller 128 also can be responsible for responding with a default policy and any updated policy or policies. The default or updated policies can be processed by the security controller 128 and transmitted to the security server 126.

The personalization controller 130 can be a front controller and can be used for personalization requests. For example, the personalization controller 130 can utilize local personalization data to distribute personalization information to the service terminals 106 as needed. If local personalization data is not available, the personalization controller 130 can communicate with the enterprise personalization module 112 for personalization data.

The report server 132 can complete various reporting requests. For example, the report server 132 can receive requests for reports from one of the service terminals 106 or the reporting module 118. The report server 132 can process the requests and compile the necessary data as well as format the data in accordance with the request. The processed and formatted data can be forward to the web application 108 or a service terminal 104 for viewing by a user. The reports can be customized, new reports types or formats added, templates created or modified using the report server 132. In addition, default reports can be generated at periodic intervals and forward to security server 126 and security module 110 in order to monitor and update security protocols.

The service configuration module 122 include data representing a picklist 160, a tender type 162, a general configuration 164, a device configuration 166, personalization 168, and security configuration 170. The picklist 160 can include product information for each product or service a merchant sells or provides. The tender type 162 can include data indicating acceptable forms of payment, such as cash and various credit cards. The tender type 162 can also explicitly identify forms of payment that are not acceptable, such a personal check.

The general configuration 164 default configurations for service terminals 106 and can be received from configuration module 114. The device configuration 166 can include configuration data for a specific service terminal 106. For example, one of the service terminals 106 can be for use only by a manager or supervisor. As a result, the service terminal 106 can have a different configuration than a default configuration.

Personalization 168 can include user profile data and other preferences set by a user to alter the appears and feel of the service terminals 106. The personalization 168 data may not change the operation of the service terminals, which is set by the configuration data, but instead just changes the look of user interfaces.

The security configuration 170 can include default and updated or custom security protocols. The security protocols can be pushed to the service terminals 106 at predetermined intervals, such as nightly, or immediately when they become available. The various information associated with the service configuration module 122 can be saved in a database 134. In addition, the service configuration module 122 can include transaction and sales data 136. The transaction and sales data 136 can be received from the service terminals 106 or device manager 124 as described herein.

The device manager 124 can include an error reporter 138, a device health monitor 140, a firmware updater 142, and a device configuration module 144. The error reporter 138 can operate in conjunction with the report server 132 to generate reports. For example, the error reporter 138 can forward information about errors associated with service terminals 106 to the report server 132 for use in generating reports on the status of the service terminals 106.

The device health monitor 140 can monitor each of the service terminals 106 and forward any abnormalities in operations to the error reporter 138. The device health monitor 140 can continuously or periodically ping the service terminals 106 to detect fault conditions. The device health monitor 140 can also monitor the status of the store service 104. Thus, if a fault condition is present or conditions that could lead to a fault are present in the store server 104, the device health monitor 140 can report the fault or conditions to the error reporter for notification of a user.

The firmware updater 142 can periodically check the main server 102 for firmware updates for service terminals 106 and shared devices 146. The firmware updater 142 can push the firmware updates to the service terminals 106 and shared devices 146 during idle times.

The device configuration module 144 can be used to enable or disable service terminals 106 and shared devices 146. For example, a service terminal (e.g., service terminal 1) may be experiencing a repeated fault condition. As a result, the device configuration module 144 can disable the service terminal 106.

Turning now to the service terminals 106, the service terminals 106 can be any self-service terminal such as automated teller machines or self-service check out terminals or kiosks. In addition, the service terminals 106 can include manned service terminals such as traditional cash registers. Other examples of service terminals 106 can include mobile devices, such as smart phones, that can allow a user to make purchases. For example, a user can scan items with his or her mobile phone and the mobile phone can interact with a terminal located in the store via a Wi-Fi, Bluetooth, or other near field communication protocol to allow the user to pay for his or her items without having to stop at a checkout terminal, such as a traditional point of sale device.

As mentioned above, the service terminals can be connected to the shared devices 146. The use of the shared devices 146 can allow multiple service terminals 106 to use a single device in order to save costs. For example, the service terminals 106 can be connected to s shared printer, shared scanner, etc.

The service terminals 106 can include a point of sale (POS) module 148, a service adapter 150, a configuration module 152, a client user interface (UI) and workflow module 154, a new UI module 156, and an electronic payment system (EPS) module 158. During operation, the POS module 148 can execute POS modules and communicate with EPS module 158 in order to allow goods and services to be sold. The configuration module 152 can receive configuration data from the store server 104. The configuration module 153 can pass configuration and security data to the various components of the service terminal 106.

The client UI and workflow module 154 can handle presenting a UI on a display such that a user can interact with the service terminal 106. The client UI and workflow module 154 can include a plurality of UIs. For example, the plurality of UIs can include a default UI that is used by a new user or a user that does not have personalization data available. The plurality of UIs can also include UIs used by maintenance people when servicing the service terminals 106. For example, maintenance UI can present functions that a technician can use, but would not be useful to a customer trying to purchase goods or services. The client UI and work flow module 154 can also receive data from the new UI module 156. The new UI module 156 can include information regarding beta UIs that are being tested, customized UIs that are loaded for particular users, etc.

The service adapter 150 can monitor a status of the service terminal 106. By monitoring the status of the service terminal 106, the service adapter 150 can remove the service terminal 106 from service when a fault is detected or conditions are present that could result in a fault. In addition, the service adapter 150 can transmit service data and transaction data to the store server 104.

Figure 2:
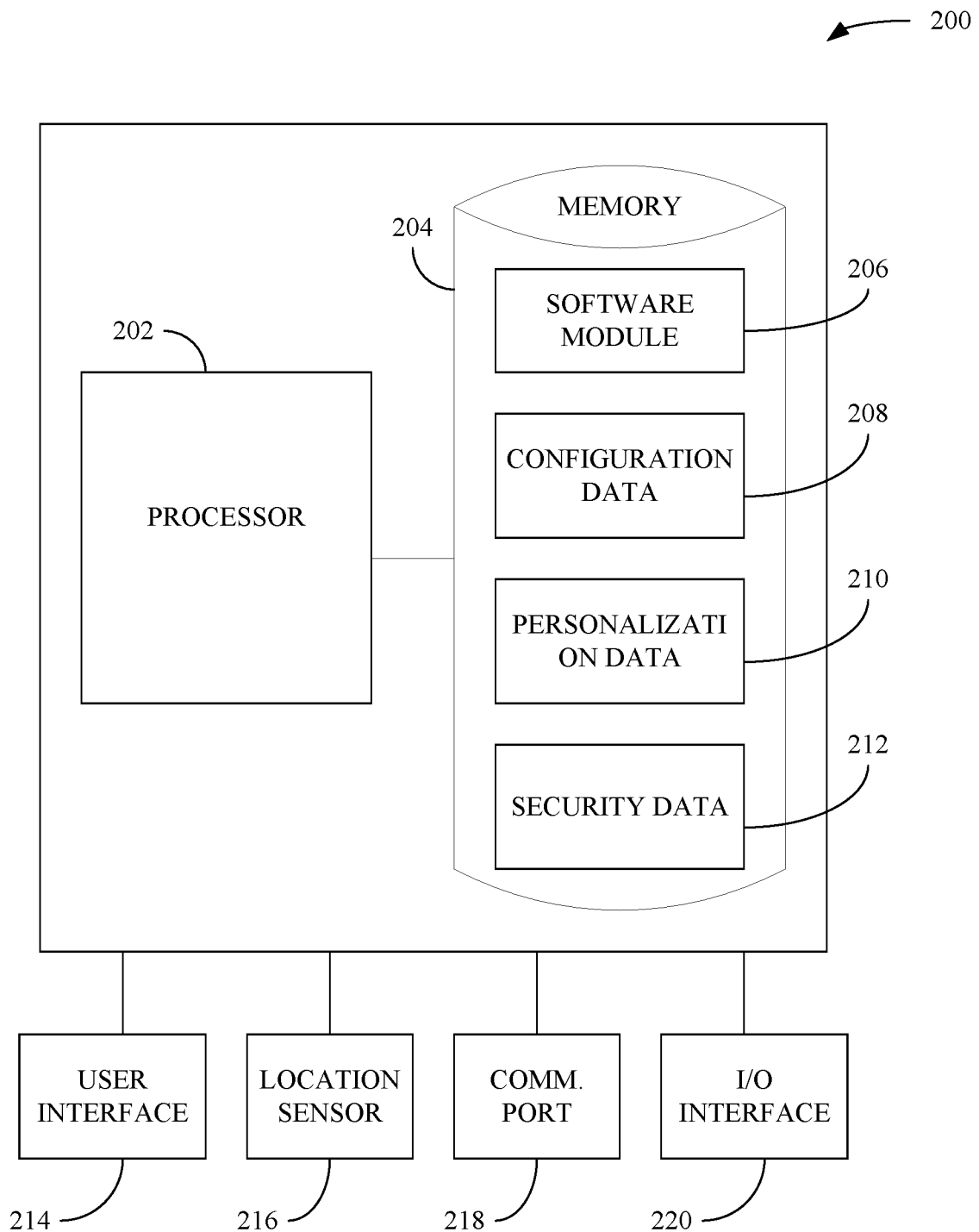
FIG. 2 shows an example schematic of a computing device consistent with embodiments disclosed herein.

FIG. 2 shows an example schematic of a computing device 200. As shown in FIG. 2, the computing device 200 can include a processor 202 and a memory unit 204. The memory unit 204 can include software 206, configuration data 208, personalization data 210, and security data 212. While executing on the processor 202, the software 204 may perform processes for executing an integrated retail platform, including, for example, one or more stages included in method 300 described below with respect to FIG. 3.

The configuration data 208 can include instructions, algorithms, and other information that the processor 202 can utilize in configuring a device for operation. The personalization data 208 can include user preferences and other data supplied by a user to personalize a UI. The security data 212 can include encryption algorithms, public and private keys, conditions needed to be satisfied before access to currency is granted or transactions altered or voided.

As disclosed herein the computing device 200 can be used to implement the main server 102, the store servers 104, and the service terminals 106. For example, the computing device 200 can be the main server 102 and the configuration data 208 can be data associated with configuration module 114. Still consistent with embodiments, the computing device 200 can be used to implement a store server 104 and the configuration data 208, personalization data 210, and security data 212 can be received from the main server 102 and pushed to the service terminals 106. Still consistent with embodiments, the computing device 200 can be a service terminal, and the configuration data 208, the personalization data 210 and the security data 212 can be data received from the store server 104 and received from a user.

The computing device 200 can also include a user interface 214. The user interface 214 can include any number of devices that allow a user to interface with the computing device 200. Non-limiting examples of the user interface 112 include a keypad, a microphone, a speaker, a display (touchscreen or otherwise), etc.

The computing device 200 can also include a media acceptor/dispenser 216. For example, if the computing device 200 is being used to implement the service terminals, the media acceptor/dispenser 216 can include any number of devices that allow a user to insert media into or receive media from the computing device 200. The media acceptor/dispenser 216 can be a single unit that performs both functions of accepting and dispensing media or the media acceptor/dispenser 216 can be multiple units. The media acceptor/dispenser 216 can interface with the POS module 148 and be a component of the EPS module 158 that can be used when completing transactions.

The computing device 200 can also include a communications port 218. The communications port 218 can allow the computing device 200 to communicate with information systems, remote servers, other self-service terminals, etc. For example, the communication port 218 can be an Ethernet card that allows the store servers 104 to communicate with the main server 102 and the service terminals 106. Non-limiting examples of the communications port 116 include, Ethernet cards (wireless or wired), Bluetooth® transmitters and receivers, near-field communications modules, etc.

The computing device 200 can also include an input/output (I/O) device 220. The I/O device 220 can allow the computing device 200 to receive and output information. Non-limiting examples of the I/O device 220 include, a camera (still or video), a scanner, etc. For example, the I/O device 220 can be scanner of a self-service terminal used to scan items at checkout.

Figure 3:
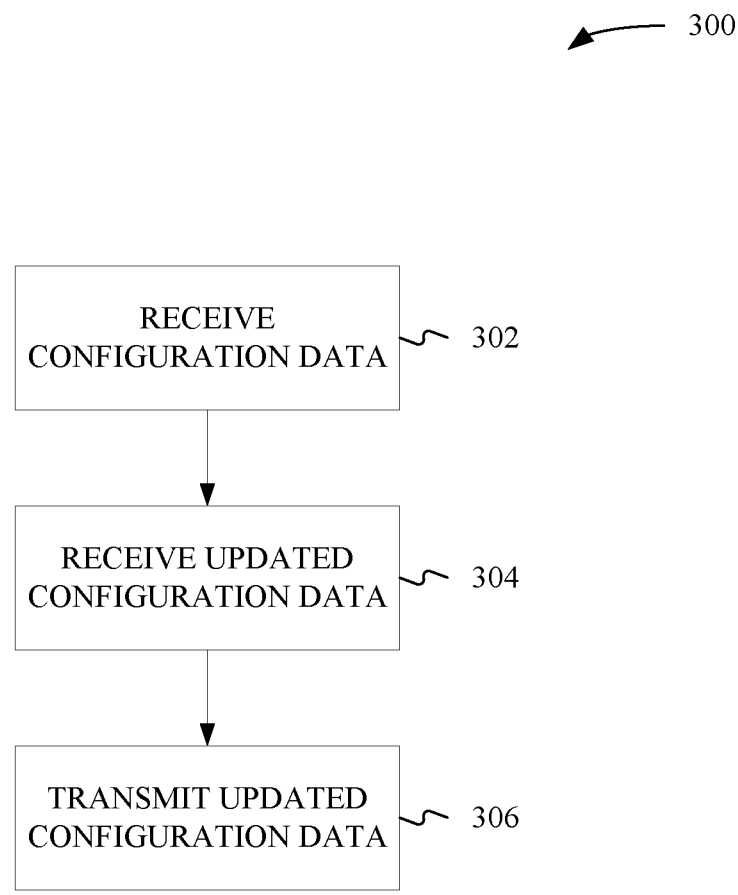
FIG. 3 shows an example method for an integrated retail platform consistent with embodiment disclosed herein.

FIG. 3 shows an example method 300 for implementing the integrated retail platform 100. The method 300 can begin at stage 302 where configuration data can be received. The configuration data can be for a plurality of service terminals, such as the service terminals 106. The configuration data can be received by the computing device 200, which can be used to implement the main server 102, the store servers 104, and the service terminals 106. For example, the main server 102 can receive the configuration data via the web application 108. In addition, the store servers 104 can receive the configuration data from the main server 102. The service terminals 106 can receive the configuration data from the store servers 104.

From stage 302, the method 300 can proceed to stage 304 where updated configuration data can be received. The update configuration data can include data supplied by a user to override a default configuration. In addition, the updated configuration data can include configuration updates generated by a component of the integrated retail platform 100. For example, the store server 104 can generate updated configuration data based on an analysis of store transactions and update the configuration of each of the service terminals 106 accordingly.

From stage 304, the method 300 can proceed to stage 306 where the update configuration data can be transmitted. For example, the updated configuration data generated by the store server 104 can be transmitted to each of the service terminals 106. Still consistent with embodiments, the updated configuration data can originate from the main server 102 and be transmitted to the store servers 104. For instance, the updated configuration data can include product data for each product offered by a merchant. When the merchant updates its products or services, the updated product data can be distributed as updated configuration data.

The method 300 can also include other stages. For example, the method 300 can include transmitting security data to a plurality of remote terminals. For instance, the method 300 can include transmitting security data from the main server 102, via security module 110, to the store servers 104, which can in turn further distribute the security data to the service terminals 106.

The method 300 can also include receiving and transmitting custom configuration data that can define custom configurations for one of a plurality of remote terminals. For example, one of the service terminals 106 may be usable only by a manager or supervisor. As such, the one of the service terminals 106 can receive custom configuration data transmitted by the store server 104.

The method 300 can also include generating reports. For example, the store servers 104 can be used to generate reports for service terminals 106 located within a store where the store server 104 is located. In addition, the store server 104 can generate a report for a subset of service devices. For instance, the store server 104, or the main server 102, can generate a report for service terminals 106 located in the lawn and garden section of a store or all the service terminals 106 located in the lawn and garden section of all the stores implementing the integrated retail platform 100.

The method 300 can also include receiving diagnostic data and generating a diagnostic report. For example, each of the service terminals 106 can transmit diagnostic data to the store server 104. The store server 104 can used the data to generate a diagnostic report for each of the service terminals 106. The diagnostic report can include maintenance data indicate a fault associate with one of the service terminals. In addition, the store servers 104 can transmit diagnostic data, received from the service terminals or filtered by the store servers 104, to the main server 102. The main server 102, utilizing the reporting module 118, can use the maintenance data to generate maintenance reports.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
 providing executable instructions to a processor of a server from a non-transitory computer-readable storage medium causing the processor to perform processing comprising:

receiving configuration data for a plurality of service terminals, wherein the configuration data comprising instructions and algorithms, wherein receiving further includes receiving user personalization data from a web interface to the server from a user interacting with the web interface, wherein the personalization data comprising personalized user data for interacting with the service terminals;

receiving updated configuration data for the plurality of service terminals, wherein receiving further includes receiving at least a portion of the updated configuration data as an override of a default configuration for the service terminals and receiving another portion of the updated configuration data based on analysis of transactions processed on the service terminals;

transmitting the updated configuration data and the personalization data to the plurality of service terminals causing the plurality of service terminals to operate with the updated configuration data and with the personalization data; and transmitting security data defining a security protocol for each of the plurality of service terminals to each of the plurality of service terminals causing the plurality of service terminals to enforce the security protocol, wherein the security data comprises security keys, security conditions, and encryption algorithms; and managing the service terminals by monitoring operations being performed on the service terminals, analyzing transactions associated with the operations, providing additional updated configuration data to the service terminals based at least in part on the analyzing and causing the service terminals to operate with the additional updated configuration data by executing the corresponding instructions and the corresponding algorithms associated with the additional updated configuration data, and sending further updated configuration data received to the service terminals causing the service terminals to operate with the further updated configuration data by executing the corresponding instructions and the corresponding algorithms associated with the additional updated configuration data.

2. The method of claim 1, wherein the configuration data and the updated configuration data each include product data for each product offered by a merchant.

3. The method of claim 1, further comprising receiving custom configuration data, the custom configuration data defining a custom configuration for one of the plurality of service terminals.

4. The method of claim 1, further comprising generating a report for the plurality of service terminals.

5. The method of claim 1, further comprising generating a report for a subset of the plurality of service terminals.

6. The method of claim 1, further comprising:
receiving diagnostic data from each of the plurality of service terminals; and
generating a diagnostic report for each of the plurality of service terminals, the diagnostic report including maintenance data indicating a fault associated with one of the plurality of service terminals.

7. The method of claim 1, further comprising receiving user profile data, the user profile data defining preferences for the user of at least one of the plurality of service terminals.

8. The method of claim 7, wherein the user includes a customer of a merchant.

9. The method of claim 7, wherein the user includes an employee of a merchant.

10. A store server comprising:
a processor; and
a memory that includes instructions that are executed by the processor, causing the processor to perform operations comprising:
receiving configuration data for a plurality of service terminals from a main server, the plurality of service terminals and the store server located within the same retail establishment, wherein the configuration data comprising instructions and algorithms;

receiving personalization data from a user through a web interface to the store server, wherein the personalization data comprising personalized user data for interacting with the service terminals;

receiving updated configuration data for the plurality of service terminals the main server, receiving at least a portion of the updated configuration data as an override of a default configuration for the service terminals, and receiving another portion of the updated configuration data based on analysis of transactions processed on the service terminals;

transmitting the updated configuration data and the personalization data to the plurality of service terminals causing the plurality of service terminals to operate with the updated configuration data and the personalization data;

transmitting security data defining a security protocol for each of the plurality of service terminals to each of the plurality of service terminals causing the plurality of service terminals to enforce the security protocol, wherein the security data comprises security keys, security conditions, and encryption algorithms; and managing the service terminals by monitoring operations being performed on the service terminals, analyzing transactions associated with the operations, providing additional updated configuration data to the service terminals based at least in part on the analyzing and causing the service terminals to operate with the additional updated configuration data by executing the corresponding instructions and the corresponding algorithms associated with the additional updated configuration data, and sending further updated configuration data received to the service terminals causing the service terminals to operate with the further updated configuration data by executing the corresponding instructions and the corresponding algorithms associated with the additional updated configuration data.

11. The system of claim 10, wherein the operations further comprise receiving custom configuration data, the custom configuration data defining a custom configuration for one of the plurality of service terminals.

12. The system of claim 10, wherein the operations further comprise generating a report for the plurality of service terminals.

13. The system of claim 10, wherein the operations further comprise:
receiving diagnostic data from each of the plurality of service terminals; and
generating a diagnostic report for each of the plurality of service terminals, the diagnostic report including maintenance data indicating a fault associated with one of the plurality of service terminals.

14. A service terminal comprising:
a display;
a processor; and
a memory that includes instructions that are executed by the processor, causing the processor to perform operations comprising:
receive updated configuration data, the updated configuration data including common configurations for a plurality of service terminals including the service terminal, the updated configuration data received from a store server located with the same retail establishment as the plurality of service terminals, wherein at least a portion of the updated configuration data is received as an override of a default configuration for the service terminal, and wherein another portion of the updated configuration data is based on analysis of transactions processed on the service terminal;
process instructions and algorithms associated with the configuration data causing the service terminal to operate based on the configuration data;
receive security data defining a security protocol for the plurality of service terminals from the main server, wherein the security data comprises security keys, security conditions, and encryption algorithms;
enforcing the security data during operation of the service terminal;
receive personalization data from the store server for a user wherein the personalization data comprising personalized user data for interacting with the service terminals;
process the personalization data causing the service terminal to provide personalization based on the personalization data;
operating the service terminal with the updated configuration data and the personalization data;
enforcing by the service terminal the security protocol during the operating;
present a User Interface (UI) on a display of the service terminal based on the processing of the instructions and the algorithms of the configuration data for interaction by the user during a given transaction;
transmit status data, service data, and transaction data for transactions processed on the service terminal to the store server;
remove the service terminal from service upon detection of a fault or conditions that can result in a fault preventing the service terminal from processing the transactions;
transmitting diagnostic data for the service terminal to the store server;
periodically transmit usage data indicating a level of usage of the service terminal, to the store server;
process additional instructions and additional algorithms associated with updated configuration data, personalization data, and security data received from the store server.

15. The service terminal of claim 14, wherein the updated configuration data includes product data for each product offered by a merchant.

16. The service terminal of claim 14, wherein the operations further comprise receiving custom configuration data, the custom configuration data defining a custom configuration for the service terminal.

17. The service terminal of claim 14, wherein the operations further comprise transmitting the diagnostic data to a central computing device, the diagnostic data indicating at least one of the following:
the fault associated with the service terminal; and
a performance trend associated with the service terminal, the performance trend indicating a decrease in performance of the service terminal likely to cause a future failure of the service terminal.

18. The service terminal of claim 14, wherein the operations further comprise receiving user profile data, the user profile data defining a preference for the user of the service terminal, the user including a customer or employee of a merchant.

* * * * *